United States Patent
Shea

(10) Patent No.: US 8,649,497 B1
(45) Date of Patent: Feb. 11, 2014

(54) METHOD AND APPARATUS FOR PROVIDING RELIABLE PATH FOR DIRECT INWARD DIAL CALLS

(75) Inventor: James Shea, Howard Beach, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1320 days.

(21) Appl. No.: 11/413,296

(22) Filed: Apr. 28, 2006

(51) Int. Cl.
*H04M 3/22* (2006.01)

(52) U.S. Cl.
USPC ............. 379/221.03; 379/134; 379/220.01; 379/231; 370/352

(58) Field of Classification Search
USPC ............. 379/220.01, 279, 134, 231, 221.03; 370/352
See application file for complete search history.

(56) References Cited

U.S. PATENT DOCUMENTS

| | | | | |
|---|---|---|---|---|
| 3,748,396 A | * | 7/1973 | Hestad et al. | 379/196 |
| 4,811,381 A | * | 3/1989 | Woo et al. | 379/88.19 |
| 4,926,462 A | * | 5/1990 | Ladd et al. | 379/88.26 |
| 5,838,769 A | * | 11/1998 | McNeil et al. | 379/14 |
| 6,741,696 B1 | * | 5/2004 | Moriyama | 379/265.01 |
| 6,990,320 B2 | * | 1/2006 | LeCren | 455/67.11 |
| 2002/0176359 A1 | * | 11/2002 | Durinovic-Johri et al. | 370/229 |
| 2003/0156583 A1 | * | 8/2003 | Prager et al. | 370/389 |
| 2005/0226218 A1 | * | 10/2005 | Berkowitz et al. | 370/352 |

* cited by examiner

*Primary Examiner* — Ahmad Matar
*Assistant Examiner* — Jirapon Intavong

(57) ABSTRACT

A method and system for providing reliable path for Direct Inward Dial (DID) calls on networks, e.g., Time Division Multiplexed (TDM) networks, the packet networks Voice over Internet Protocol (VoIP) and Service over Internet Protocol (SoIP) networks are disclosed. In one embodiment, the present method enables the customers to request for a reliable path for Direct Inward Dial (DID) calls. For example, the present method enables a service provider to connect a customer's switch, e.g., a PBX, to two or more switches (or softswitches) via two separate DID trunk groups. The method also enables the service provider to create a DID trunk group between the two or more switches (or softswitches) connected to the customer's switch. With this architecture, the service provider is able to continue to forward DID calls towards the customer's switch even if one of the two separate DID trunk groups has failed.

11 Claims, 4 Drawing Sheets

METHOD AND APPARATUS FOR PROVIDING RELIABLE PATH FOR DIRECT INWARD DIAL CALLS

The present invention relates generally to communication networks and, more particularly, to a method for providing a reliable network for direct inward dial calls on networks, e.g., packet networks such as Voice over Internet Protocol (VoIP) and Service over Internet Protocol (SoIP) networks, the Time Division Multiplexed (TDM) network, and the like.

BACKGROUND OF THE INVENTION

Businesses and consumers rely on their communications infrastructure to conduct business and to carry traffic for a variety of applications such as voice and data. Each enterprise subscribes to telecommunications services based on their need to handle a specific number of simultaneous calls to and from the enterprise. Calls within the enterprise are then handled using a Private Branch Exchange (PBX) system or network. Users of the PBX share the outside lines for making calls to destinations external to the enterprise and for receiving calls from sources outside the enterprise. The capacity through the PBX may be partitioned and dedicated for different purposes, e.g., for outbound calls, incoming calls, toll-free calls, etc. When a user of a PBX originates a telephone call, the PBX assigns an outside line and forwards the call towards the service provider's network. If a failure affects a trunk group being used for outbound calls (e.g., direct outbound dial), the PBX can utilize another trunk group. If a failure affects a trunk group being used for incoming traffic (e.g., direct inward dial), the network continues to forward traffic towards the failed trunk and the direct inward dial calls cannot be completed.

Therefore, there is a need for a method that provides a reliable path for direct inward dial calls.

SUMMARY OF THE INVENTION

In one embodiment, the present invention discloses a method and apparatus for providing a reliable path for direct inward dial calls on networks, e.g., packet networks such as Voice over Internet Protocol (VoIP) and Service over Internet Protocol (SoIP) networks, a Time Division Multiplexed Network (TDM), and the like. In one embodiment, the present method enables the customers to request for a reliable path for Direct Inward Dial (DID) calls. For example, the present method enables a service provider to connect a customer's switch, e.g., a PBX, to two or more switches (or softswitches) via two separate DID trunk groups. The method also enables the service provider to create a DID trunk group between the two or more switches (or softswitches) connected to the customer's switch. With this architecture, the service provider is able to continue to forward DID calls towards the customer's switch even if one of the two separate DID trunk groups has failed.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing reliable path for direct inward dial calls on networks, e.g., packet networks such as Voice over Internet Protocol (VoIP) and Service over Internet Protocol (SoIP) networks. Although the present invention is discussed below in the context of providing information on VoIP and SoIP networks, the present invention is not so limited. Namely, the present invention can be applied to other networks such as a time division multiplexed network and a wireless network.

Figure 1:
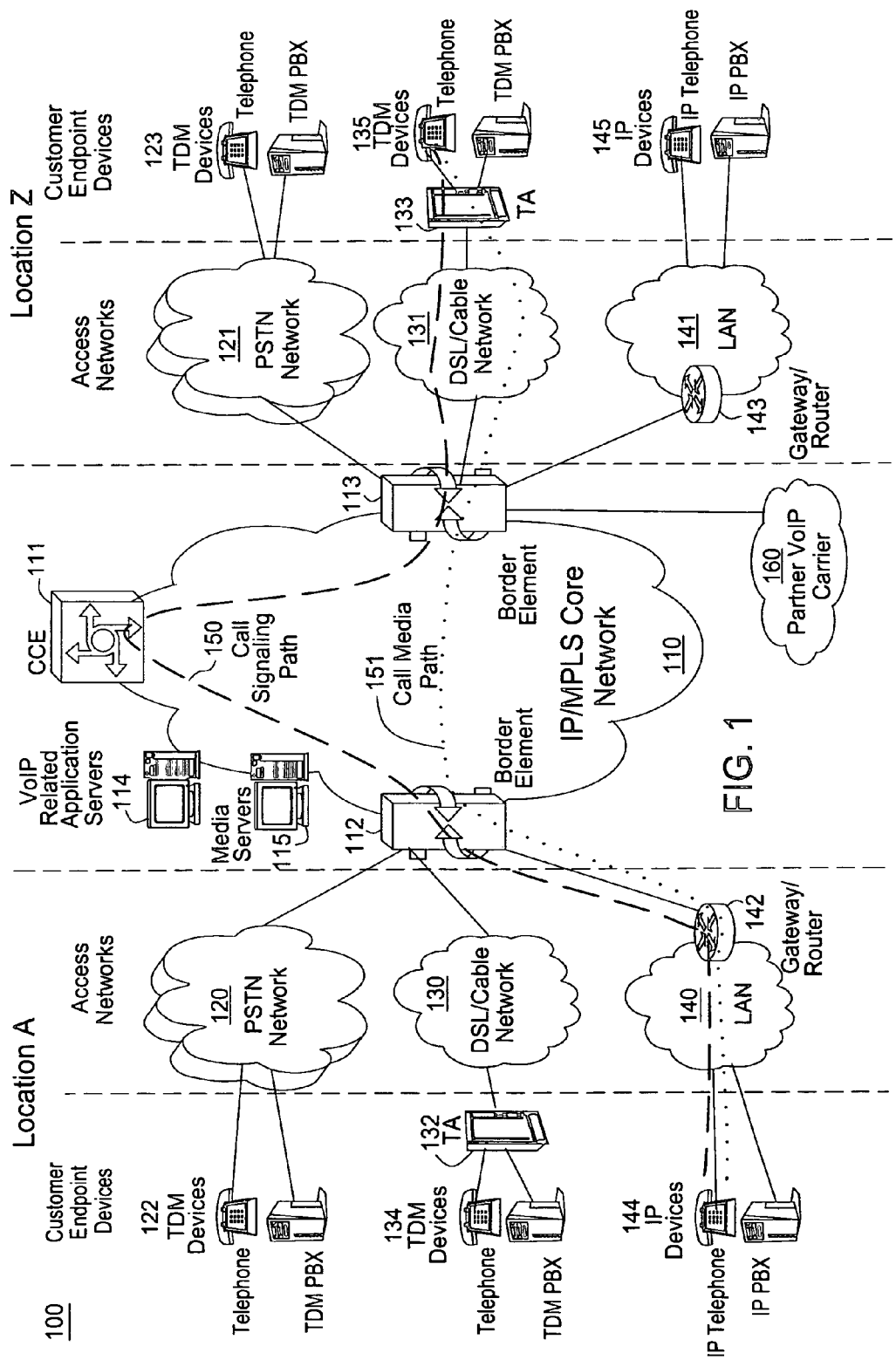
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported on networks, e.g., VoIP and SoIP networks. Businesses and consumers rely on their communications infrastructure to conduct business and to carry traffic for a variety of applications such as voice and data. Each enterprise customer determines the required bandwidth of the telecommunications service to handle a specific number of simultaneous calls to and from the enterprise prior to subscribing to the service. Calls within the enterprise are handled using a Private Branch Exchange (PBX). Users of the PBX share the outside lines for making calls to destinations external to the enterprise and for receiving calls from sources outside the enterprise. The capacity may be partitioned for outbound calls, incoming calls, toll-free calls, etc. by creating trunk groups, and connecting each trunk group to a switch in the service provider's network. If a failure that affects a trunk group used for outbound traffic occurs between the switch in the central office and the PBX, the PBX may send the outbound traffic on another trunk group. However, if a similar failure affects a trunk group used for incoming calls, the calls cannot be completed. Thus, the failure of a trunk group associated with incoming calls may have a very significant impact on the business. For example, if the customers of the enterprise cannot reach the enterprise, revenue may be impacted. Therefore, there is a need for a method to provide a reliable path for incoming (e.g., direct inward dial) calls.

In one embodiment, the current invention discloses a method and apparatus for providing reliable path for direct inward dial calls on networks, e.g., packet networks such as VoIP and SoIP networks. In order to clearly illustrate the teachings of the current invention, the following terminologies and networking concepts will first be described:

Calling party;
Called party;
Switches;
Trunk;
Trunk group;
Trunk group identifier;
Direct Inward Dial (DID) trunk group;
Direct Inward Dial (DID) call; and
Direct Outbound Dial (DOD) trunk group.

Calling party refers to the person or device that originates the call. The called party refers to the person or device that receives the call. For example, if a person calls 911 for obtaining emergency service, the calling party is the person dialing 911 and the called party is the person or device answering the telephone and receiving the 911 call.

Switches are devices that channel incoming data from any of multiple input ports to an output port used to transmit the data towards its destination. In a circuit switched telephone network, one or more switches are used to setup a dedicated connection for exchanging data among two or more destinations. On a Local Area Network (LAN) the switch may use the Media Access Control (MAC) address of the device to determine the source and destination of each packet. On Wide Area Networks (WAN) such as the IP network, the switch may use the IP address in each packet overhead to lookup the destination in a routing table and then determines the output port for the next part of the trip towards the destination. For example, if the destination address in the IP overhead identifies the next part of the trip as being transmission towards a specific border element, the output port in the switch used to exchange packets with the specific border element is identified. The packet is then transmitted towards its destination using the identified output port.

Trunk refers to a transmission channel between two switching centers. Trunk group refers to two or more telephone lines or trunks of the same type between two given point. For example, an enterprise receiving a T1 service from a service provider has 1.544 Mbps of capacity available for use. The T1 line can support up to 24 channels each at 64 kbps. The enterprise may group the first 8 channels for incoming calls, the $9^{th}$ through $16^{th}$ channel for outgoing calls, and the $17^{th}$ through $24^{th}$ channels for customers calling with toll free numbers. The T1 then has three trunk groups. Each trunk group has the same type of telephone lines, e.g. for inbound calls, outbound calls, etc., and is assigned a trunk group identifier.

The trunk group dedicated for incoming calls is referred to as Direct Inward Dial (DID) trunk group. A call utilizing a DID trunk group is called a DID call. For example, if a call to the enterprise is routed through the service provider's network towards the DID trunk group and then carried over the DID trunk group towards the PBX, the call is said to be a DID call. The trunk group for outbound calls is referred to as Direct Outbound Dial (DOD) trunk group. The callers within the enterprise are given an access code to initiate calls to outside of the enterprise. The channels for outbound calls are assigned when the calls are initiated from behind a trunk group. In the above example, the calls within the enterprise are handled using the PBX in the enterprise customer's network and are not limited by the capacity of the T1. The channels within a trunk group are designed to be indistinguishable. Users of the PBX share the outside lines for making calls to destinations external to the enterprise and for receiving calls from sources outside the enterprise. The enterprise avoids the cost of connecting each telephone in the enterprise to an external telephone line, and obtains network services based on shared usage of outside lines.

An enterprise's PBX is a switch or switching system that is connected to a switch in the service provider's network. The switch may be hardware based as in the traditional network, or a softswitch as in the packet networks VoIP and SoIP. The switch assigns the numbers for the phone lines and manages the trunk groups. Since the numbers are assigned to the outside phone lines and not to the individual telephones within the enterprise, more users can be added to the same outside phone line as long as the demand for capacity can be met. The PBX may have several DOD and DID trunk groups. The PBX may connect an outbound call to any phone line in a trunk group dedicated for outbound calls. However, the incoming calls must pass through the specific switch that handles the particular trunk group. For example, an enterprise with 1000 users may have its PBX connected to a switch (e.g., at a central office) and have a trunk group with capacity to handle 24 voice channels dedicated for DID calls. The calling party may dial any of the 1000 telephone numbers. The other switches throughout the global network route the call to the particular switch handling the trunk group. The switch receives an inbound call and forwards it towards the PBX for completion. When a failure occurs on a DOD trunk group, the PBX may send the call on another trunk group being used for outbound traffic. However, when a failure occurs on a DID trunk group, the DID call cannot be completed. Therefore, there is a need for a method that provides a reliable path for DID calls.

In one embodiment, the current invention provides a reliable path for DID calls. For example, the service provider enables the enterprise customer to connect the PBX to two switches. The service provider also enables the customer to subscribe to two separate DID trunk groups for connecting to the two switches and to another trunk group for connecting the two switches. The service provider then utilizes the trunk group between the two switches for rerouting DID calls in case either one of the trunk groups connected to the PBX fails. For example, a PBX in an enterprise customer's network is connected to two switches with two separate DID trunk groups each handling 500 telephone numbers. The customer also subscribes to a trunk group to connect the two switches with capacity to handle 500 calls. If one of the trunk groups fails, the switch that normally forwards the calls to the PBX, forwards the calls to the other switch via the trunk group between the switches. The calls then use the trunk group that did not fail to reach the PBX. Note that the trunk group between the switches may be used to provide alternate path for multiple trunk groups. The number of trunk groups needed between the switches is determined by studying the probability of having multiple failures on the trunk groups connected to the same PBX.

Figure 2:
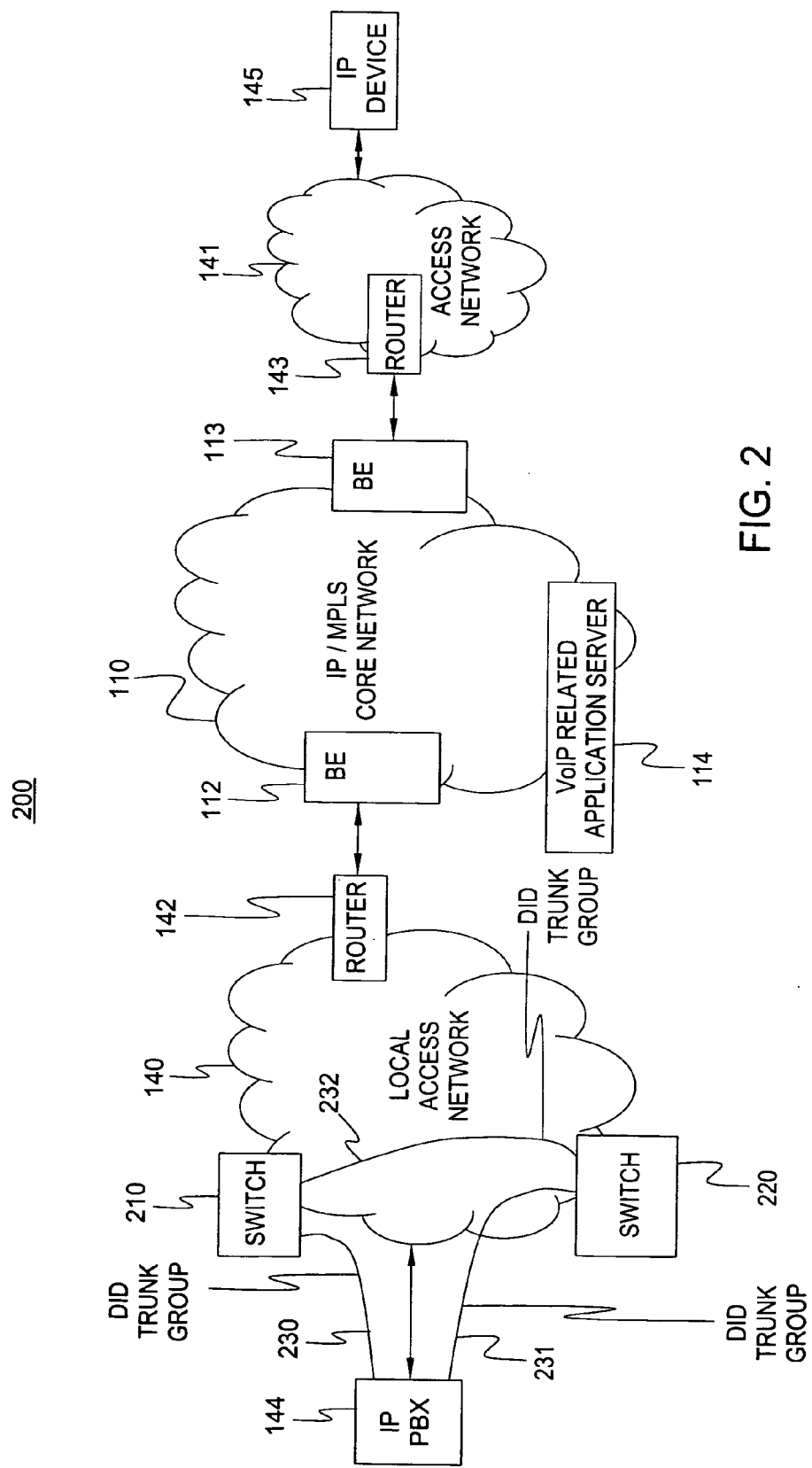
FIG. 2 illustrates an exemplary network with one embodiment of the invention for providing a reliable path for direct inward dial calls.

FIG. 2 illustrates an exemplary network 200 with one embodiment of the present invention for providing reliable path for direct inward dial calls. For example, the network service provider may utilize a VoIP application server 114 located in the IP/MPLS core network 110 for providing VoIP services. An enterprise customer may request for a reliable path for DID calls from the service provider. The network service provider may then connect the enterprise customer's IP PBX 144 to a plurality of network switches, e.g., softswitches 210 and 220, in the access network 140. The access network 140 may contain a gateway router 142. The router 142 is connected to the IP/MPLS core network 110 through a border element 112. It should be noted that although FIG. 2 illustrates the access networks as being separate from the Core network, those skilled in the art will realize that it is possible to have both networks being deployed as a single network or they can be operated by a single service provider.

In one embodiment, the service provider creates a DID trunk group 230 between the PBX 144 and the softswitch 210. The service provider also creates a DID trunk group 231 between the PBX 144 and the softswitch 220, and a trunk group 232 between the softswitch 210 and the softswitch 220. In operation, a call from a customer of the enterprise using IP device 145 and be connected to a user (not shown) of the PBX 144 in the enterprise location. The IP device 145 is connected to an access network 141. The access network 141 may contain a gateway router 143, which is connected to the IP/MPLS core network 110 through a border element 113. Thus, the calls from the IP device 145 destined to the PBX 144 will traverse the core network 110 from border element 113 to border element 112. The border element 112 will then forward the calls to the router 142. The router 142 will then forward the calls to either softswitch 210 or 220 based on the destination telephone number. For example, if softswitch 210 is used for the trunk group handling the enterprise phone numbers ending with the last 3 digits 000-499 and the called phone number is in that group, then the call is forwarded to softswitch 210. However, if the called phone number falls within the trunk group serviced by softswitch 220, then the call is forwarded to softswitch 220.

Given this novel architecture, the network service provider is now able to provide an alternative route to the softswitch 210, e.g., to utilize the trunk group 232 when the performance of DID trunk group 230 is affected. Namely, the softswitch 220 is employed to process the calls coming via trunk group 232 and forwards the calls to the PBX 144 on DID trunk group 231 for completion. Similarly, if the performance of DID trunk group 231 is affected, the softswitch 220 forwards the calls towards the softswitch 210 via trunk group 232. The softswitch 210 will then forward the calls to the PBX for completion.

Thus, the trunk group 232 is utilized to provide an alternate path for calls normally using either of the DID trunk groups 230 or 231. Note that the softswitch receives the calls for the trunk group it normally handles as well as the calls, if necessary, forwarded to it from the other softswitch connected to the same PBX. For example, when the DID trunk group 230 fails, the softswitch 220 will then handle the calls that normally utilize the DID trunk group 231 and the calls forwarded to it from the softswitch 210 via the trunk group 232. Note that only the network elements used to describe the present invention are illustrated in FIG. 2. It is not intended to show all network elements used to deliver a VoIP or SoIP service.

Figure 3:
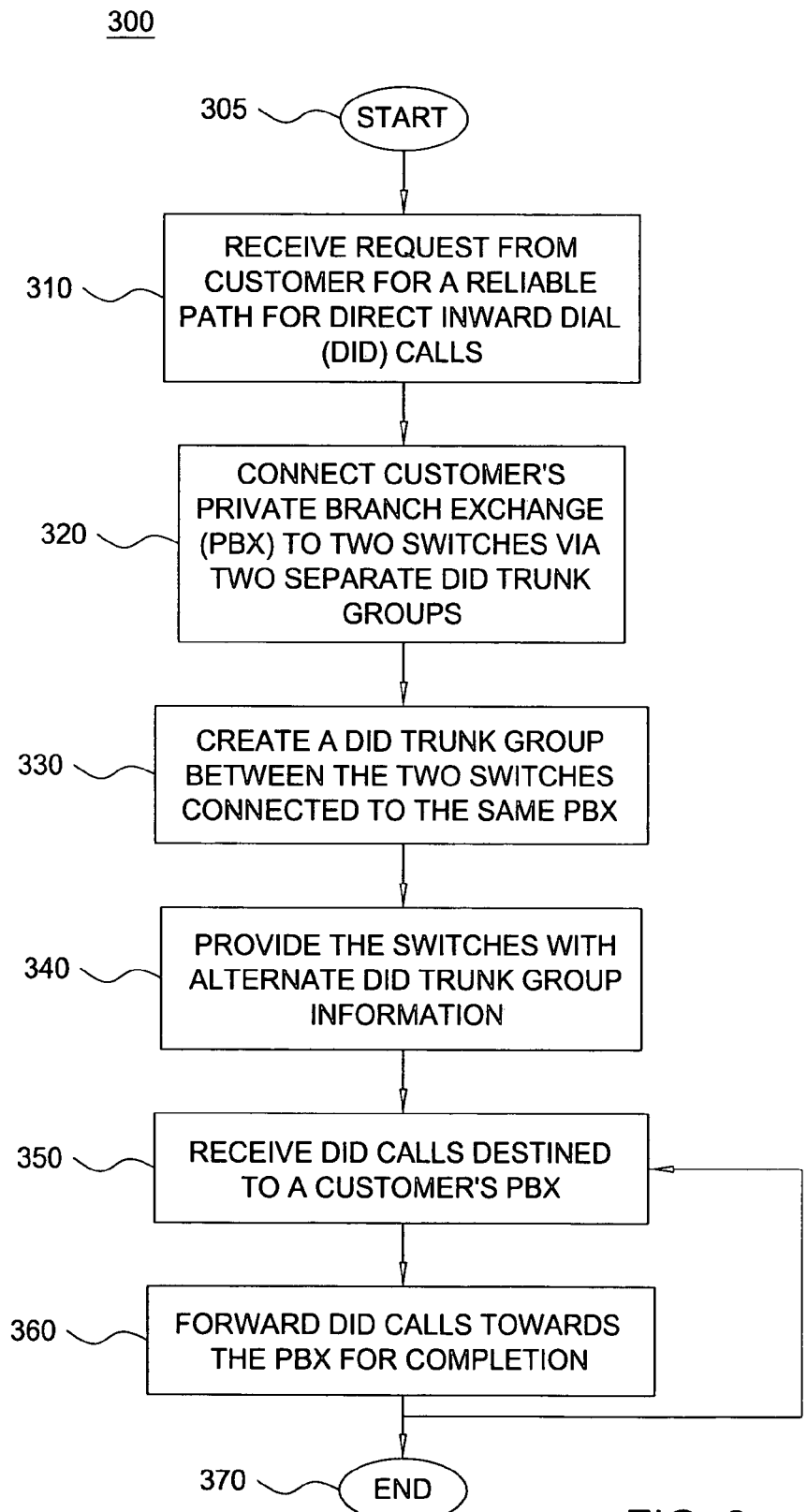
FIG. 3 illustrates a flowchart of the method for providing a reliable path for direct inward dial calls.

FIG. 3 illustrates a flowchart 300 of one embodiment of the present invention for a network service provider to provide a reliable path for DID calls. The service provider enables an enterprise customer to subscribe to a network service with reliable path for DID calls. For example, a corporation (e.g., an enterprise customer) may subscribe various services from a service provider and requests for the functionality of obtaining additional trunk groups for use during network failures, congestion, etc. In response, the service provider will deploy a plurality of switches and a plurality of truck groups to interlace with the enterprise's PBX.

Method 300 starts in step 305 and proceeds to step 310. In step 310, method 300 receives a request from an enterprise customer for a reliable path for DID calls. The service provider may provide the reliable path for DID calls as part of an additional feature upgrade such as a premium service. For example, the customer contacts the service provider and requests for an upgrade to more reliable services.

In step 320, method 300 connects the enterprise customer's IP PBX to two or more switches (or softswitches) via two or more separate DID trunk groups. For example, the PBX may be connected to two separate switches located in two different central offices. Each of the DID trunk groups then serves a portion of the users of the PBX.

In step 330, method 300 further creates at least one DID trunk group between the two switches (or softswitches) connected to the customer's PBX. In one embodiment, if the two DID trunk groups connected to the PBX are supporting unequal number of users, the trunk group between the two switches is sized to handle the larger requirement. For example, if a DID trunk group is handling 500 lines and the second DID trunk group is handling 1000 lines, the trunk group between the two switches is sized to handle 1000 lines such that a failure of either trunk is protected.

In step 340, method 300 provides the switches (softswitches) with alternate DID trunk group information. For example, a switch is informed of the existence of another DID trunk group that can handle calls to the same PBX. The switch is also provided with the trunk group it should use to reach the other switch attached to the same PBX.

In step 350, method 300 receives calls destined to the PBX. Note that the call may be for a trunk group normally served by the switch itself or for a trunk group normally served by another switch attached to the same PBX. If the call is normally served by another switch, the call is received via a trunk group created between the two switches in step 330.

In step 360, method 300 forwards the DID call towards the PBX for completion. Thus, DID calls are then able to reach the customer's PBX regardless of which DID trunk group initially provided the service to the customer. The method then proceeds to step 350 to receive more calls or to step 370 to end processing of a current call. Method 300 ends in step 370.

Figure 4:
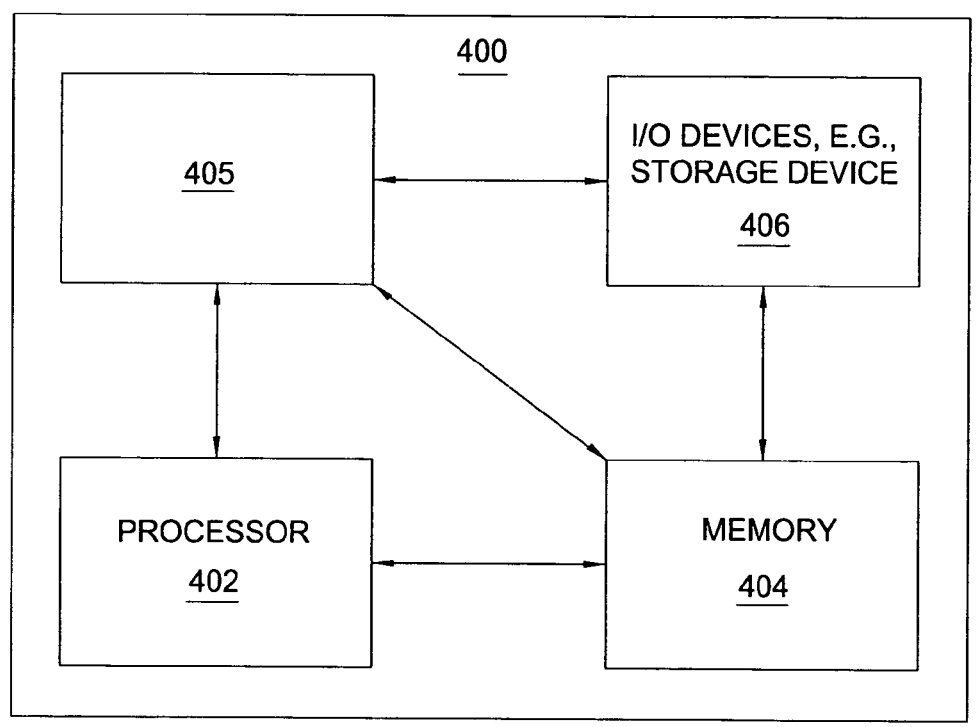
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a reliable path for DID calls, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing a reliable path for DID calls can be loaded into memory 404 and executed by processor 402 to implement the functions as discussed above. As such, the present method 405 for providing a reliable path for DID calls (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a path for direct inward dial calls, in a communication network, comprising:

connecting, via a processor, a customer's switch to a plurality of network switches via a plurality of separate direct inward dial trunk groups, where each of the plurality of separate direct inward dial trunk groups is coupled to a different network switch of the plurality of network switches, wherein the customer's switch is a private branch exchange system;

creating, via the processor, a direct inward dial trunk group between the plurality of network switches that are connected to the customer's switch, wherein the direct inward dial trunk group between the plurality of network switches is subscribed as a service by a customer of the customer's switch;

enabling, via the processor, the plurality of network switches to process direct inward dial calls forwarded towards the customer's switch; and allowing, via the processor, a network switch of the plurality of network switches to continue to process the direct inward dial calls to the customer's switch via the path when a direct inward dial trunk group of the plurality of separate direct inward dial trunk groups has failed, wherein the allowing comprises the direct inward dial calls being channeled, via the direct inward dial trunk group between the plurality of network switches, to another network switch that is coupled to one of separate direct inward dial trunk group of the plurality of separate direct inward dial trunk groups that is still operating.

2. The method of claim 1, wherein the communication network is an access network.

3. The method of claim 1, wherein a capacity of the direct inward dial trunk group between the plurality of network switches, is sized to be not less than a largest capacity of a direct inward dial trunk group of the plurality of separate direct inward dial trunk groups.

4. The method of claim 1, wherein the path for direct inward dial calls is provided as the service by a service provider.

5. A non-transitory computer-readable medium storing a plurality of instructions which, when executed by a processor, cause the processor to perform operations for providing a path for direct inward dial calls, in a communication network, the operations comprising:

connecting a customer's switch to a plurality of network switches via a plurality of separate direct inward dial trunk groups, where each of the plurality of separate direct inward dial trunk groups is coupled to a different network switch of the plurality of network switches, wherein the customer's switch is a private branch exchange system;

creating a direct inward dial trunk group between the plurality of network switches that are connected to the customer's switch, wherein the direct inward dial trunk group between the plurality of network switches is subscribed as a service by a customer of the customer's switch;

enabling the plurality of network switches to process direct inward dial calls forwarded towards the customer's switch; and allowing a network switch of the plurality of network switches to continue to process the direct inward dial calls to the customer's switch via the path when a direct inward dial trunk group of the plurality of separate direct inward dial trunk groups has failed, wherein the allowing comprises the direct inward dial calls being channeled, via the direct inward dial trunk group between the plurality of network switches, to another network switch that is coupled to one of separate direct inward dial trunk group of the plurality of separate direct inward dial trunk groups that is still operating.

6. The non-transitory computer-readable medium of claim 5, wherein the communication network is an access network.

7. The non-transitory computer-readable medium of claim 5, wherein a capacity of the direct inward dial trunk group between the plurality of network switches, is sized to be not less than a largest capacity of a direct inward dial trunk group of the plurality of separate direct inward dial trunk groups.

8. The non-transitory computer-readable medium of claim 5, wherein the path for direct inward dial calls is provided as the service by a service provider.

9. A system for providing a path for direct inward dial calls, in a communication network, comprising:

a plurality of network switches for connecting with a customer's switch via a plurality of separate direct inward dial trunk groups, where each of the plurality of separate direct inward dial trunk groups is coupled to a different network switch of the plurality of network switches, where the plurality of network switches is enabled to process direct inward dial calls forwarded towards the customer's switch, wherein the customer's switch is a private branch exchange system; and a direct inward dial trunk group between the plurality of network switches that are connected to the customer's switch, wherein the direct inward dial trunk group between the plurality of network switches is subscribed as a service by a customer of the customer's switch, wherein a network switch of the plurality of network switches is enabled to continue to process the direct inward dial calls to the customer's switch via the path, when a direct inward dial trunk group of the plurality of separate direct inward dial trunk groups has failed, wherein the allowing comprises the direct inward dial calls being channeled, via the direct inward dial trunk group between the plurality of network switches, to another network switch that is coupled to one of separate direct inward dial trunk group of the plurality of separate direct inward dial trunk groups that is still operating.

10. The system of claim 9, wherein the communication network is an access network.

11. The system of claim 9, wherein a capacity of the direct inward dial trunk group between the plurality of network switches, is sized to be not less than a largest capacity of a direct inward dial trunk group of the plurality of separate direct inward dial trunk groups.

\* \* \* \* \*